(12) United States Patent
Liu et al.

(10) Patent No.: US 11,466,731 B2
(45) Date of Patent: Oct. 11, 2022

(54) MAGNETIC LEVITATION BEARING STRUCTURE AND MAGNETIC LEVITATION COMPRESSOR STRUCTURE

(71) Applicant: GREE ELECTRIC APPLIANCES, INC. OF ZHUHAI, Guangdong (CN)

(72) Inventors: Penghui Liu, Zhuhai (CN); Xiaobo Zhang, Zhuhai (CN); Fang Zhang, Zhuhai (CN); Gao Gong, Zhuhai (CN); Chao Zhang, Zhuhai (CN); Jiuzhan Su, Zhuhai (CN); Xin Li, Zhuhai (CN); Ruhao Dong, Zhuhai (CN); Mingxing Deng, Zhuhai (CN); Fei Wang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 17/289,213

(22) PCT Filed: Sep. 2, 2019

(86) PCT No.: PCT/CN2019/103990
§ 371 (c)(1),
(2) Date: Apr. 27, 2021

(87) PCT Pub. No.: WO2020/103520
PCT Pub. Date: May 28, 2020

(65) Prior Publication Data
US 2021/0341016 A1  Nov. 4, 2021

(30) Foreign Application Priority Data

Nov. 21, 2018 (CN) .......................... 201811397403.9

(51) Int. Cl.
 F16C 32/04 (2006.01)
 H02K 7/09 (2006.01)
 F04D 25/06 (2006.01)

(52) U.S. Cl.
 CPC ........ *F16C 32/0489* (2013.01); *F16C 32/047* (2013.01); *F16C 32/0446* (2013.01);
 (Continued)

(58) Field of Classification Search
 CPC .............. F16C 32/0489; F16C 32/0446; F16C 32/0461; F16C 2360/44; F16C 2380/26;
 (Continued)

(56) References Cited

U.S. PATENT DOCUMENTS 5,152,679 A    10/1992   Kanemitsu et al.
5,736,802 A *  4/1998   Ueyama ............. F16C 32/0451
                                                    310/90

(Continued)

FOREIGN PATENT DOCUMENTS

CN    1128061 A    7/1996
CN    1528548 A    9/2004
(Continued)

OTHER PUBLICATIONS

Extended European Search Report for European Application No. 19887051.1 dated Nov. 16, 2021 (8 pages).

*Primary Examiner* — Ahmed Elnakib
(74) *Attorney, Agent, or Firm* — J. Miguel Hernandez; James R. Gourley; Carstens & Cahoon, LLP

(57) ABSTRACT

Magnetic levitation bearing structure includes a cylinder body, a rotating shaft, a motor stator, a motor rotor, an axial bearing, a radial bearing and a displacement sensing device; the displacement sensing device, the axial bearing stator, and the radial bearing stator are directly fixed on an inner wall of the cylinder body.

10 Claims, 1 Drawing Sheet

(52) U.S. Cl.
CPC ........... *F16C 32/0461* (2013.01); *H02K 7/09* (2013.01); *F04D 25/0606* (2013.01); *F16C 2360/44* (2013.01); *F16C 2380/26* (2013.01)

(58) Field of Classification Search
CPC .................. F16C 32/0497; F16C 2362/52; F16C 32/047; F05D 2270/821; H02K 2205/03; H02K 7/083; H02K 7/09; F04D 29/051; F04D 29/058; F04D 29/624; F04D 25/0606
USPC ........................................................ 310/90.5
See application file for complete search history.

(56) References Cited

U.S. PATENT DOCUMENTS

| | | | | |
|---|---|---|---|---|
| 5,739,609 | A * | 4/1998 | Ueyama | H02K 7/09 310/90.5 |
| 5,772,564 | A * | 6/1998 | Taniguchi | B23Q 11/0028 310/90.5 |
| 5,783,887 | A * | 7/1998 | Ueyama | B23Q 17/002 310/90.5 |
| 6,215,218 | B1 * | 4/2001 | Ueyama | F16C 32/0489 310/90.5 |
| 2008/0054741 | A1 * | 3/2008 | Oyama | F16C 32/0444 417/423.4 |
| 2008/0185928 | A1 * | 8/2008 | Buhler | F16C 32/0459 310/90.5 |
| 2008/0231128 | A1 * | 9/2008 | Buhler | F16C 32/0457 310/90.5 |
| 2008/0246358 | A1 * | 10/2008 | Kubo | F16C 32/044 310/90.5 |

FOREIGN PATENT DOCUMENTS

| | | |
|---|---|---|
| CN | 106402157 A | 2/2017 |
| CN | 109281863 A | 1/2019 |
| CN | 209444603 U | 9/2019 |
| EP | 2677176 A1 | 12/2013 |
| JP | 2001003890 A | 1/2001 |
| JP | 2009022135 A | 1/2009 |

* cited by examiner

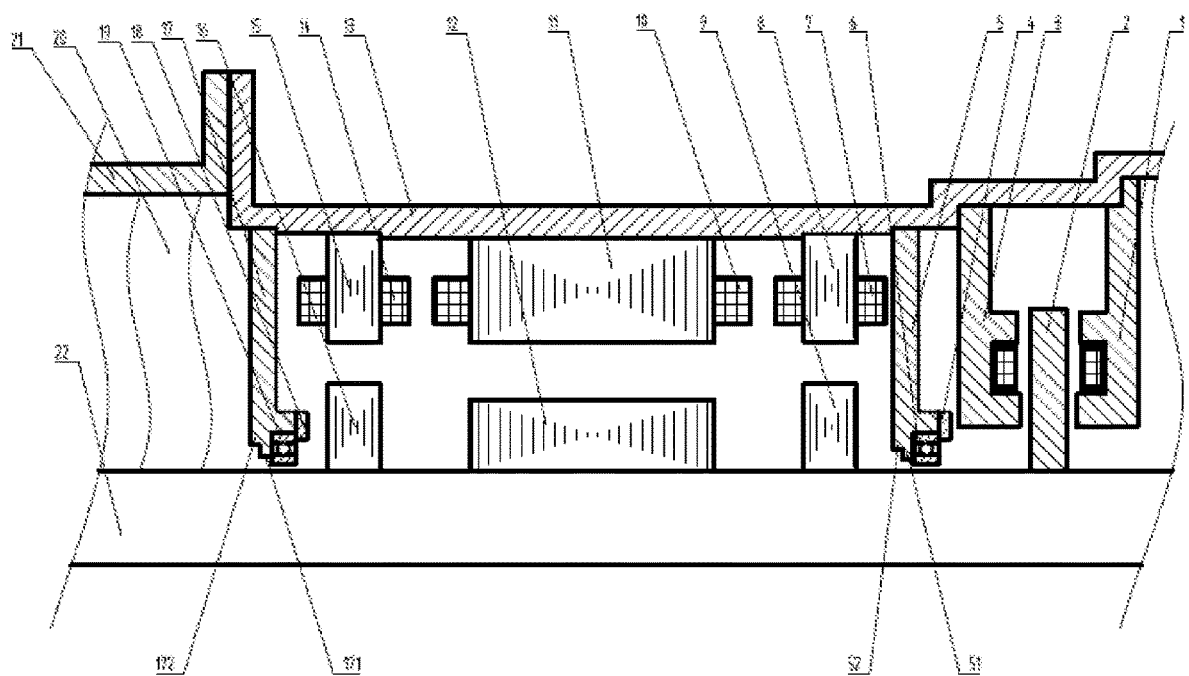

MAGNETIC LEVITATION BEARING STRUCTURE AND MAGNETIC LEVITATION COMPRESSOR STRUCTURE

CROSS REFERENCE TO RELATED APPLICATION

This application is a U.S. National Stage of International Application No PCT/CN2019/103990, filed on Sep. 2, 2019, and published as WO 2020/103520 A1 on May 28, 2020, which claims priority to Chinese Patent Application No. 2018/11397403.9, entitled "New Type of Magnetic levitation compressor structure", and filed on Nov. 21, 2018, the content of which is expressly incorporated herein by reference in its entirety. Every patent application and publication listed in this paragraph is hereby incorporated by reference in its entirety.

TECHNICAL FIELD

The present disclosure relates to the field of air conditioner technology, and particularly relates to a magnetic levitation bearing structure and a new type of magnetic levitation compressor structure.

BACKGROUND

At present, the conventional magnetic levitation compressor is a centrifugal compressor consisting of a high-speed motor, a magnetic levitation bearing, a displacement sensor, a bearing protection structure, a pneumatic component, a bearing controller, and a motor driver.

The Chinese patent 201510279957.9 discloses a permanent magnet biased axial magnetic bearing centrifugal compressor and a centrifugal compressor, using the permanent magnet biased axial magnetic bearing.

The technical solution of the above patent is that: the permanent magnet biased axial magnetic bearing includes a right axial magnetic pole, a left axial magnetic pole, a stator magnetic core, a main shaft, a thrust plate and a permanent magnet. The left axial magnetic pole is connected to the right axial magnetic pole; the stator magnetic core is provided on a right side of the right axial magnetic pole or a left side of the left axial magnetic pole; the main shaft is provided in an axial opening formed by the left axial magnetic pole, the right axial magnetic pole and the stator magnetic pole. The thrust plate sleeves the main shaft, and a first axial gap is provided between the thrust plate and the stator magnetic core. The permanent magnet is provided between the stator magnetic core and the right axial magnetic pole or between the stator magnetic core and the left axial magnetic pole.

SUMMARY

The technical problem to be solved by the present disclosure overcomes the inadequacies of the conventional technology. A new type of magnetic levitation bearing structure is provided, specifically, in order to solve the above technical problem, the technical solution adopted by the disclosure is provided as follows.

A new type of magnetic levitation bearing structure is provided, which includes a cylinder body, a rotating shaft, a motor stator, a motor rotor, an axial bearing, a radial bearing and a displacement sensing device; the axial bearing including an axial bearing stator and an axial bearing rotor, the radial bearing including a radial bearing stator and a radial bearing rotor; the motor rotor, the axial bearing rotor, and the radial bearing rotor sleeving the rotating shaft, the motor stator sleeving in the cylinder body; the displacement sensing device, the axial bearing stator, and the radial bearing stator being directly fixed on an inner wall of the cylinder body.

In some embodiments, the axial bearing stator is a magnetic levitation rear axial bearing and a magnetic levitation front axial bearing, and the axial bearing rotor is a thrust bearing.

In some embodiments, the thrust bearing is located between the magnetic levitation rear axial bearing and the magnetic levitation front axial bearing.

In some embodiments, the radial bearing stator includes a magnetic levitation rear radial bearing stator and a magnetic levitation front radial bearing stator, the radial bearing rotor includes a magnetic levitation rear radial bearing rotor and a magnetic levitation front radial bearing rotor.

In some embodiments, the magnetic levitation rear radial bearing stator and the magnetic levitation front radial bearing stator are fixedly arranged in the cylinder body, and are located on both sides of the motor stator.

In some embodiments, the magnetic levitation rear radial bearing rotor and the magnetic levitation front radial bearing rotor sleeve the rotating shaft and are located on both sides of the motor rotor.

In some embodiments, the magnetic levitation rear radial bearing stator is provided with a magnetic levitation rear radial bearing stator winding, and the magnetic levitation front radial bearing stator is provided with a magnetic levitation front radial bearing stator winding.

In some embodiments, the displacement sensing device includes a rear displacement sensor assembly and a front displacement sensor assembly; the rear displacement sensor assembly and the front displacement sensor assembly are fixedly arranged in the cylinder body, the rear displacement sensor assembly is located on a side of the magnetic levitation rear radial bearing stator away from the magnetic levitation front radial bearing stator, and the front displacement sensor assembly is located on a side of the magnetic levitation front radial bearing stator away from the magnetic levitation rear radial bearing stator.

In some embodiments, a rear secondary protection and a rear displacement sensor are provided at an inner diameter of the rear displacement sensor assembly; a front secondary protection and a front displacement sensor are provided at an inner diameter of the front displacement sensor assembly.

In some embodiments, a rear ball bearing is provided at the inner diameter of the rear displacement sensor assembly, and a front ball bearing is provided at the inner diameter of the front displacement sensor assembly.

In some embodiments, a rear ball bearing baffle is provided on an outer side of the rear ball bearing, and a front ball bearing baffle is provided on an outer side of the front ball bearing.

A new type of magnetic levitation compressor structure is provided, which uses the above-mentioned new type of magnetic levitation bearing structure.

Advantages of the present disclosure are provided as follows.

Compared with the original technology, in the present disclosure, the front and rear bearing housing in the magnetic levitation compressor are removed, accordingly the production cost of the compressor is reduced; compared with the original solution, the coaxiality of the displacement sensor assembly and the motor stator is greatly improved, which can reduce the unilateral magnetic pulling force during the operation of the motor, reduce the harmonic waves generated by the motor winding, reduce the iron core loss of the motor, and also reduce the heat value of the motor. At the same time, the efficiency of the compressor can also be improved, meanwhile it can be more accurate to detect the distance between the primary protection as well as the secondary protection and the shaft. When the primary protection is in contact with the shaft during operation, the compressor can stop in time to avoid damage caused by continuous contact between the primary protection or secondary protection and the high-speed rotating shaft (in the original solution, the primary protection is far away from the displacement sensor, when the shaft rotates at a high speed, the shaft at the primary protection may be deformed due to factors such as the high speed and temperature, while the displacement sensor is far away from the primary protection and cannot accurately detect the distance between the shaft and the primary protection; sometimes the primary protection may be in contact with the high-speed rotating shaft, and the displacement sensor fails to detect the contact between the two, so that the protection and shutdown program is not started in time); and the present sensor assembly is larger than the original sensor, accordingly the housing of the sensor has a higher accuracy during processing.

BRIEF DESCRIPTION OF THE DRAWINGS

In order to more clearly describe the technical solution in the embodiment of the present disclosure or the related art, the accompanying drawing required for describing the embodiment or the related art is briefly introduced. Obviously, the drawing in the following description is only the embodiment of the present disclosure. Those of ordinary skill in the art can obtain other drawings based on the disclosed drawing without creative work.

FIG. 1 is a schematic diagram illustrating a magnetic levitation stator core.

DETAILED DESCRIPTION

In order to make the purpose, technical solution, and advantages of the present disclosure clearer, the technical solution of the present disclosure will be described clearly and completely in conjunction with specific embodiments and the corresponding drawings in the present disclosure. Obviously, the described embodiments are merely some embodiments of the present disclosure, rather than all the embodiments. Based on the embodiments in the present disclosure, all other embodiments obtained by those of ordinary skill in the art without creative work fall within the protection scope of the present disclosure.

In some embodiments of the present disclosure, a magnetic levitation compressor structure adopting a new type of magnetic levitation bearing structure is provided, as shown in FIG. 1, which includes a magnetic levitation rear axial bearing 1, a thrust bearing 2, a magnetic levitation front axial bearing 3, a rear ball bearing baffle 4, a rear displacement sensor assembly 5, a rear secondary protection 51, a rear displacement sensor 52, a rear ball bearing 6, a magnetic levitation rear radial bearing stator winding 7, a magnetic levitation rear radial bearing stator 8, a magnetic levitation rear radial bearing rotor 9, a motor stator winding 10, a motor stator 11, a motor rotor 12, a cylinder body 13, a magnetic levitation front radial bearing stator winding 14, a magnetic levitation front radial bearing stator 15, a magnetic levitation front radial bearing rotor 16, a front displacement sensor assembly 17, a front secondary protection 171, a front displacement sensor 172, a front ball bearing baffle 18, a front ball bearing 19, a pneumatic component 20, a box body 21, a rotating shaft 22. The displacement sensor and the secondary protection are formed in one piece to act as a support position of the ball bearing.

When assembling, the ball bearing 19/6 is first installed into the displacement sensor assembly (a displacement sensor probe is installed next to the secondary protection to integrate the displacement sensor and the secondary protection together), and the ball bearing cover plate is locked on the sensor assembly with screws.

Then the cylinder body 13 is heated, and the shrink-fit is performed on the motor stator 11. The magnitude of interference between the motor stator 11 and the cylinder body 13 is designed to be larger to ensure that the motor stator is displaced relative to the cylinder body 13 when the motor stator is subjected to torque during the operation of the compressor; then the shrink-fit is performed on the magnetic levitation radial bearing; the cylinder body 13 and the magnetic levitation radial bearing are designed to have a small magnitude of interference. The radial bearing is only subjected to the radial force. The small magnitude of interference can ensure that there is no relative displacement between the cylinder body 13 and the magnetic levitation radial bearing. Then, the shrink-fit is performed on the displacement sensor assembly 17/5; and the cylinder body 13 and the displacement sensor assembly are also designed to have a small interference fit. Generally, as for the displacement sensor, the primary protection is only subjected to the radial force when the displacement sensor is started or stopped or the shaft operates unsteadily. If parts are not in place during the shrink-fit process, a hydraulic machine can be employed to press the parts to the specified positions. When the temperature of the cylinder body 13 drops too fast and the shrink-fit is not completely performed on the parts, the cylinder body 13 may be placed in a high-temperature box to continue heating, but it should be noted that the heating temperature is definitely less than the maximum temperature of the parts operating on the cylinder body 13 (if it is found that the temperature of the cylinder body 13 is already lower after the shrink-fit is performed on the motor stator and is not enough to perform the shrink-fit on the magnetic levitation bearing stator, the assembly of the cylinder body is continuously heated, but the heating temperature cannot be higher than the maximum temperature allowed by the stator winding, otherwise the enameled wire as well as the insulation between the wire and the wire can be damaged).

Next, the rotating shaft 22 with the motor rotor 12 and the magnetic levitation front radial bearing rotor 16 is installed into the cylinder body 13; the magnetic levitation front axial bearing stator 3 is locked on the cylinder 13 by using screws, the thrust bearing is shrink-fitted on the rotating shaft, the magnetic levitation rear axial bearing is locked on the cylinder by using screws; finally, the box body is butted to the cylinder body, with the pneumatic parts installed and the end cover of the compressor installed.

The aforementioned description is merely preferred embodiment of the disclosure, and is not intended to limit the disclosure. For those skilled in the art, the disclosure can have various modifications and changes. Any modification, equivalent replacement, improvement, etc., made within the spirit and principle of the present disclosure shall fall within the protection scope of the present disclosure.

What is claimed is:

1. A magnetic levitation bearing structure, comprising a cylinder body, a rotating shaft, a motor stator, a motor rotor, an axial bearing, a radial bearing and a displacement sensing device; the axial bearing comprising an axial bearing stator and an axial bearing rotor, the radial bearing comprising a radial bearing stator and a radial bearing rotor; the motor rotor, the axial bearing rotor, and the radial bearing rotor sleeving the rotating shaft, the motor stator sleeving in the cylinder body;
   wherein the displacement sensing device, the axial bearing stator, and the radial bearing stator are directly fixed on an inner wall of the cylinder body;
   wherein the displacement sensing device comprises a rear displacement sensor assembly and a front displacement sensor assembly;
   wherein the radial bearing stator comprises a magnetic levitation rear radial bearing stator and a magnetic levitation front radial bearing stator,
   wherein the rear displacement sensor assembly and the front displacement sensor assembly are fixedly arranged in the cylinder body, the rear displacement sensor assembly is located on a side of the magnetic levitation rear radial bearing stator away from the magnetic levitation front radial bearing stator, and the front displacement sensor assembly is located on a side of the magnetic levitation front radial bearing stator away from the magnetic levitation rear radial bearing stator;
   wherein a rear secondary protection and a rear displacement sensor are provided at an inner diameter of the rear displacement sensor assembly; and
   a front secondary protection and a front displacement sensor are provided at an inner diameter of the front displacement sensor assembly.

2. The magnetic levitation bearing structure according to claim 1, wherein the axial bearing stator is a magnetic levitation rear axial bearing and a magnetic levitation front axial bearing, and the axial bearing rotor is a thrust bearing.

3. The magnetic levitation bearing structure according to claim 2, wherein the thrust bearing is located between the magnetic levitation rear axial bearing and the magnetic levitation front axial bearing.

4. The magnetic levitation bearing structure according to claim 1, wherein the radial bearing rotor comprises a magnetic levitation rear radial bearing rotor and a magnetic levitation front radial bearing rotor.

5. The magnetic levitation bearing structure according to claim 4, wherein the magnetic levitation rear radial bearing stator and the magnetic levitation front radial bearing stator are fixedly arranged in the cylinder body, and are located on both sides of the motor stator.

6. The magnetic levitation bearing structure according to claim 5, wherein the magnetic levitation rear radial bearing stator is provided with a magnetic levitation rear radial bearing stator winding, and the magnetic levitation front radial bearing stator is provided with a magnetic levitation front radial bearing stator winding.

7. The magnetic levitation bearing structure according to claim 4, wherein the magnetic levitation rear radial bearing rotor and the magnetic levitation front radial bearing rotor sleeve the rotating shaft and are located on both sides of the motor rotor.

8. The magnetic levitation bearing structure according to claim 1, wherein a rear ball bearing is provided at the inner diameter of the rear displacement sensor assembly, and a front ball bearing is provided at the inner diameter of the front displacement sensor assembly.

9. The magnetic levitation bearing structure according to claim 8, wherein a rear ball bearing baffle is provided on an outer side of the rear ball bearing, and a front ball bearing baffle is provided on an outer side of the front ball bearing.

10. A magnetic levitation compressor structure, comprising the magnetic levitation bearing structure according to claim 1.

* * * * *